United States Patent

Muller et al.

[11] Patent Number: 5,184,259
[45] Date of Patent: Feb. 2, 1993

[54] HELICAL-SCAN MAGNETIC TAPE APPARATUS HAVING A TAPE-TRANSPORT PATH WITH TWISTING PATH-SECTIONS FOR TAPE-PATH CORRECTION

[75] Inventors: Johannes C. A. Muller; Norbert C. Vollmann, both of Eindhoven, Netherlands

[73] Assignee: U.S. Philips Corporation, New York, N.Y.

[21] Appl. No.: 732,946

[22] Filed: Jul. 19, 1991

Related U.S. Application Data

[63] Continuation of Ser. No. 368,733, Jun. 20, 1989, abandoned.

[30] Foreign Application Priority Data

Jul. 5, 1988 [NL] Netherlands .......................... 8801699

[51] Int. Cl.⁵ .............................................. G11B 5/027
[52] U.S. Cl. .......................................... 360/85; 360/95
[58] Field of Search .... 360/84, 95, 85, 130.20–130.24, 360/130.3–130.34

[56] References Cited

U.S. PATENT DOCUMENTS

| | | | |
|---|---|---|---|
| 4,115,825 | 9/1978 | Hayashi et al. | 360/85 |
| 4,517,613 | 5/1985 | Shibuke et al. | 360/95 |
| 4,583,137 | 4/1986 | Ogiro et al. | 360/95 |
| 4,614,315 | 9/1986 | Gerrits et al. | 360/95 |
| 4,665,450 | 5/1987 | Hiraro | 360/85 |
| 4,709,280 | 11/1987 | Delacou | 360/85 X |
| 4,740,849 | 4/1988 | Kaeriyama et al. | 360/84 X |
| 4,796,115 | 1/1989 | Ohshima et al. | 360/85 |
| 4,803,574 | 2/1989 | Konishi et al. | 360/85 |
| 4,837,646 | 6/1989 | Nagai et al. | 360/85 |
| 4,866,549 | 9/1989 | Terayama et al. | 360/85 X |

FOREIGN PATENT DOCUMENTS 3509176  3/1985  Fed. Rep. of Germany .

Primary Examiner—A. J. Heinz
Assistant Examiner—Alfonso Garcia

[57] ABSTRACT

A helical scan magnetic-tape apparatus (1) including at least three tape guides (2, 25, 27, 28, 29, 30, 32, 33), including a magnetic-head unit (2). The apparatus (1) co-operates with a magnetic tape (8) wound on reels (9, 10) in a cassette (44). The tape-transport path in the apparatus includes at least three path sections (35, 36, 37) in which the tape (8) is twisted through a specific angle to correct for differences in level and inclination arising as a result of the helical path of the magnetic tape (8) around the magnetic-head unit (2).

8 Claims, 5 Drawing Sheets

HELICAL-SCAN MAGNETIC TAPE APPARATUS HAVING A TAPE-TRANSPORT PATH WITH TWISTING PATH-SECTIONS FOR TAPE-PATH CORRECTION

This is a continuation of application Ser. No. 07/368,733 filed Jun. 20, 1989 now abandoned.

BACKGROUND OF THE INVENTION

1. Field of the Invention

The invention relates to a helical-scan magnetic-tape apparatus comprising at least three tape guides having axes and including a magnetic-head unit, at least two of said tape guides also acting as tape-threading elements which are movable between a first position, corresponding to a non-operational situation in which the magnetic tape is not in contact with the tape guides, and a second position, corresponding to an operational situation in which the magnetic tape is in contact with the tape guides, which apparatus is constructed to co-operate with a magnetic tape which is wound on two co-planar reels, which each have an axis, and extends between a first and a second reel in the operational situation, a first branch being provided between the first reel and the magnetic-head unit and a second branch being provided between the second reel and the magnetic-head unit, each branch including at least one tape guide, a first path section being provided between said first reel and the tape guide nearest said reel, viewed in the direction of tape transport, a second path section being provided between said second reel and the nearest tape guide, viewed in the direction of tape transport, and further path sections being provided between two tape guides situated one after the other viewed in the direction of tape transport, both the first and the second path section being disposed in the same plane as the reels.

2. Description of the Related Art

A magnetic-tape apparatus of the type referred to above is known from DE 35 09 176 A1. In this known apparatus one branch of the tape-transport path between one reel and the magnetic-head unit is situated at the level of the reel surface and another branch of the tape-transport path between the other reel and the magnetic-head unit is situated partly at reel-surface level and is partly spaced from this level owing to the helical path of the tape around the magnetic-head unit. The latter branch is directed to reel-surface level by means of an inclined pin. For a given position and location of the magnetic-head unit and of the reels the location of this pin cannot be selected freely but must be situated on the line where the plane of the reel surface intersects the plane perpendicular to the tape section which is spaced from the plane of the reel surface. This slightly restricts the constructional freedom and necessitates the use of an additional element, in the present case an inclined pin, in the tape path, exclusively to provide a correction of the tape-transport path with respect to the deviation arising as a result of the helical path of the tape around the magnetic-head unit.

Another important aspect in magnetic-tape apparatuses is that at the location of the magnetic-head unit the tape path is susceptible to the effect of positional tolerances of the tape-path elements. This is in particular so in digital recording, where the tracks to be recorded on and to be read from the tape have a width which is being reduced continually in view of the large amount of information and the consequent requirement of increasing the information density on the tape in order to arrive at a required minimum playing time of a tape. This susceptibility to tolerances depends inter alia on the influence of the positional accuracy of the pin which is inclined relative to the longitudinal direction of the tape and which has a large tape wrapping angle, this influence on the tape path being already substantial in the case of a small deviation.

SUMMARY OF THE INVENTION

It is an object of the invention to provide a tape-transport path yielding maximal freedom of construction and requiring a minimal number of additional elements for tape-path correction.

It is another object of the invention to construct a tape-transport path in such a way that it is less susceptible to the effect of positional tolerances of the tape guides.

To this end the apparatus is characterized in that in at least three path sections the tape is twisted in that the axes of the two tape guides or of the reel and the tape guide between which a twisting path section extends intersect one another, the first branch including at least one path section and the second branch including at least two path sections in which the tape is twisted, all the path sections in which twisting occurs not extending parallel to each other in that in at least one branch. Said tape guides need not be additional guides, but use can be made of elements already present in a magnetic-tape apparatus, such as tape-threading pins, capstans and tape guides which serve for merely guiding the tape and not for correcting the tape-transport path with respect to the deviation arising as a result of the helical path of the tape around the magnetic-head unit. Thus, no additional elements are required for tape-path correction and hence the constructional freedom is not restricted in any way. Since the tape-transport path does not include any pins which are inclined relative to the longitudinal direction of the tape and which have a large wrapping angle, the susceptibility of the tape-transport path to the effect of tolerances is also reduced. The apparatus known from DE 35 09 176 A1 comprises a so-called C-deck.

DE 27 19 746 B2 describes another apparatus comprising a so-called M-deck. In the last-mentioned deck tape-path correction is achieved by means of two additional inclined pins, each arranged at one side of the magnetic-head unit in the tape-transport path. In comparison with the construction in accordance with the invention this construction has the drawback that two additional elements are needed, one element being arranged between the tape-tension sensor and the magnetic-head unit and the other element being arranged between the capstan and the magnetic-head unit. These elements lead to an increased resistance, so that the tape tension between the tape-tension sensor and the magnetic-head unit and between the capstan and the magnetic-head unit increases. In the tape-transport path in accordance with the invention the tape-tension increase is smaller, so that the tape tension is controlled at a higher tension level and the factor by which the control error is multiplied to its value at the magnetic-head unit is smaller. A further disadvantage of the M-deck is that two additional elements which are inclined relative to the longitudinal direction of the tape and which have a large tape-wrapping angle have to be positioned, which results in the tape-transport path being more susceptible to the effect of tolerances.

A preferred embodiment of the apparatus in accordance with the invention is characterized in that the apparatus comprises at least six tape guides, of which at least two tape guides are arranged in the first branch and at least three tape guides are arranged in the second branch. This has the advantage that now all the tape-path sections in which twisting occurs can be provided with tape guides at both ends of the path sections, which yields a better tape guidance than in the case of guidance by a tape guide and the magnetic-head unit or by a tape guide and a reel. A further advantage is that the lace-up from and towards the magnetic-head unit proceeds more smoothly on account of the fact that the tape can be guided away from and towards the magnetic-head unit in the appropriate manner by means of the two additional tape guides. Another important advantage of the additional tape guides resides in the fact that the tape guides together with the magnetic-head unit can now form a "sandwich" construction, which ensures that the magnetic tape is pressed onto the guide means of the magnetic-head unit. This will be explained in the following description.

Another embodiment of the apparatus in accordance with the invention is characterized in that more than three twisting path sections are provided, at least one twisting path section being provided in each branch. The advantage of this is that the three angles through which the tape is to be twisted can be divided among several path sections, which reduces the increase in stress in the tape as a result of the twisting.

A preferred embodiment of the apparatus in accordance with the invention is characterized in that at least one of the tape guides is a roller. The use of pins instead of rollers is disadvantageous for the tape transport in view of friction and the "stick-slip" effect. The use of rollers is possible because all the tape guides extend perpendicularly to the longitudinal direction and parallel to the transverse direction of the tape. If this were not the case it would be impossible to utilize rollers because the tape would then run off the rollers.

BRIEF DESCRIPTION OF THE DRAWINGS

Embodiments of the invention will now be described in more detail, by way of example, with reference to the accompanying Figures. In the Figures.

DETAILED DESCRIPTION OF THE PREFERRED EMBODIMENTS

Figure 1:
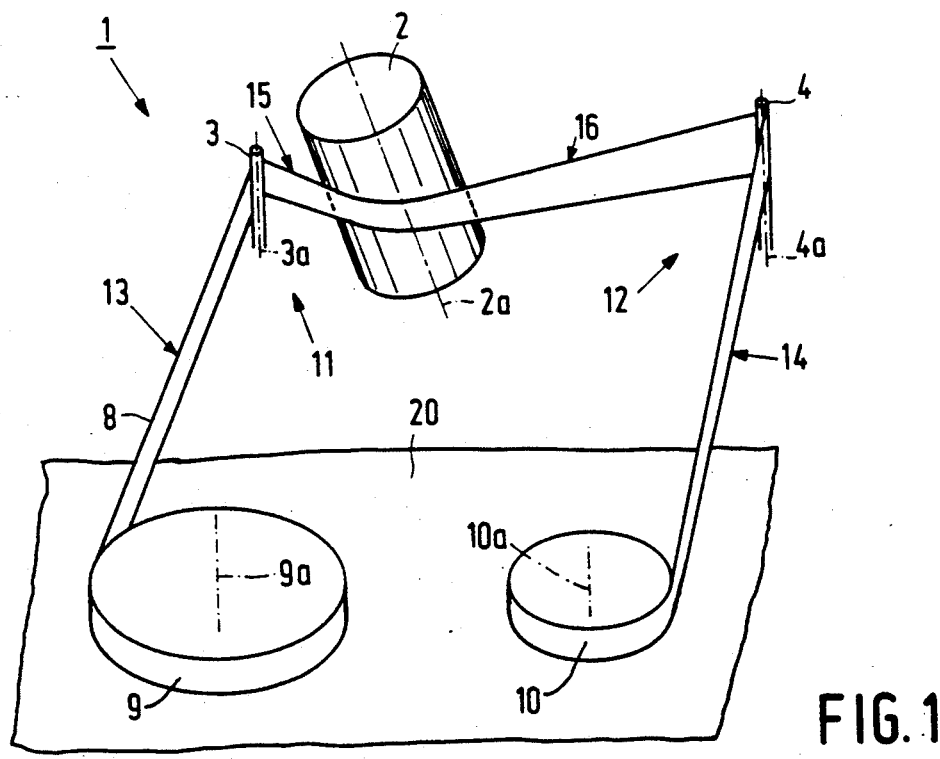
FIG. 1 shows the tape-transport path in the apparatus in an operational position and with a minimal number of tape guides.

FIG. 1 shows a tape-transport path in which a magnetic tape 8 which is partly wound on reels 9, 10 disposed on a reel surface 20 extends along a first branch 11 from a first reel 9 to a rotatable magnetic-head unit 2 via a first tape guide 3, is subsequently wrapped around a part of the circumference of the magnetic-head unit 2 along a helical path, and then extends along a second branch 12 to a second reel 10 via a second tape guide 4. A first path section 13 is situated between the first reel 9 and the first tape guide 3, a second path section 14 is situated between the second reel 10 and the second tape guide 4, a third path section 15 is situated between the magnetic-head unit 2 and the first tape guide 3, and a fourth path section 16 is situated between the magnetic-head unit 2 and the second tape guide 4.

Figure 2:
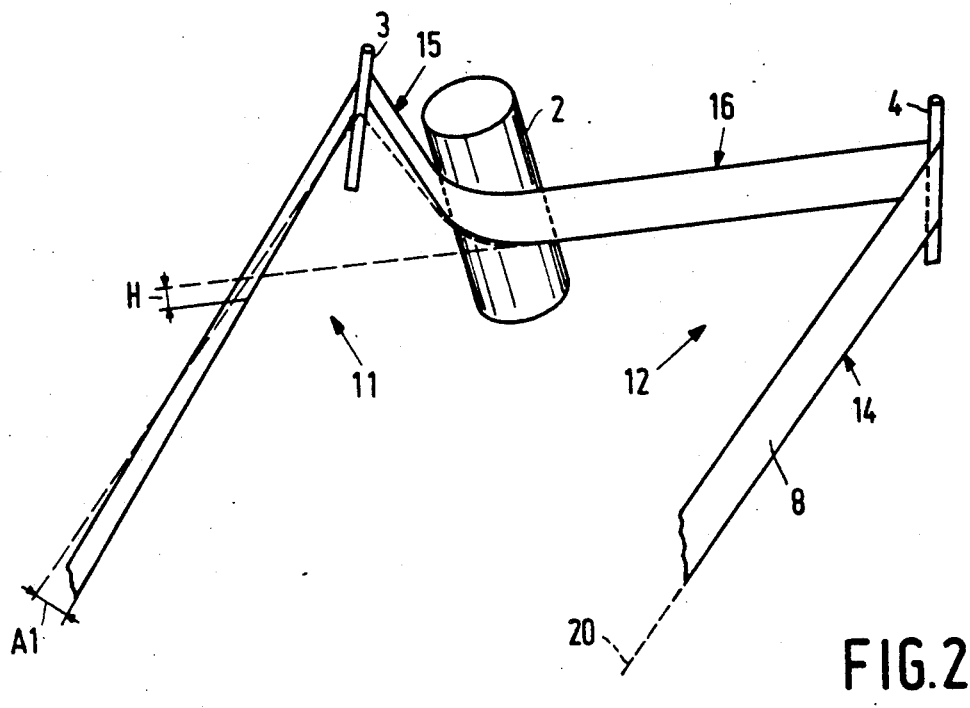
FIG. 2 represents the tape transport from and towards the magnetic-head unit without tape-path correction.

If the magnetic-head unit 2 is inclined in such a way that the second branch 12 remains at the level of the reel surface 20, i.e. if the angle between the axis of the magnetic-head unit 2 and an axis perpendicular to the reel surface 20 is equal to the pitch angle of the helical path of the tape 18 around the magnetic-head unit 2, the first branch 11 will be inclined at an angle A1 and at a height H relative to the reel surface 20 owing to this helical path (FIG. 2).

Figure 3:
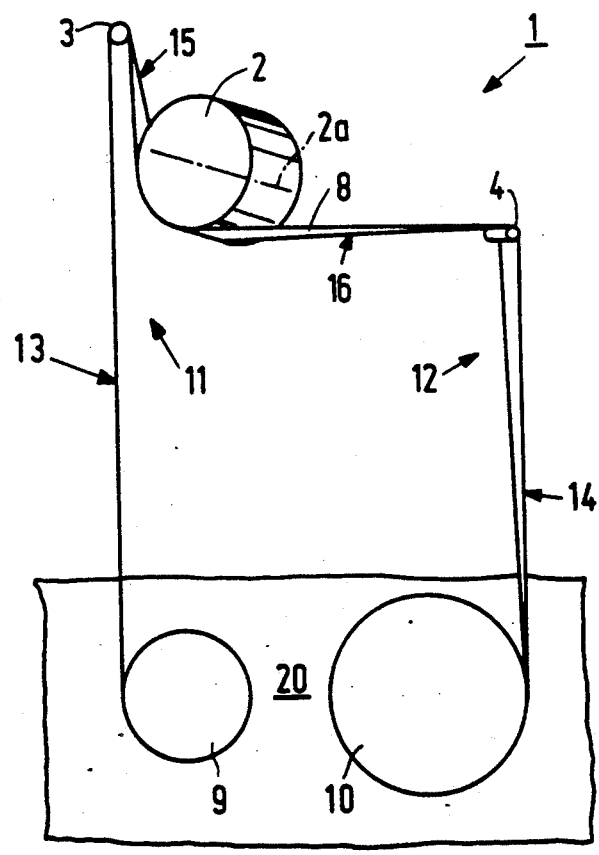
FIG. 3 shows a tape-transport path in which all path sections extend parallel or perpendicular to one another.
Figure 4:
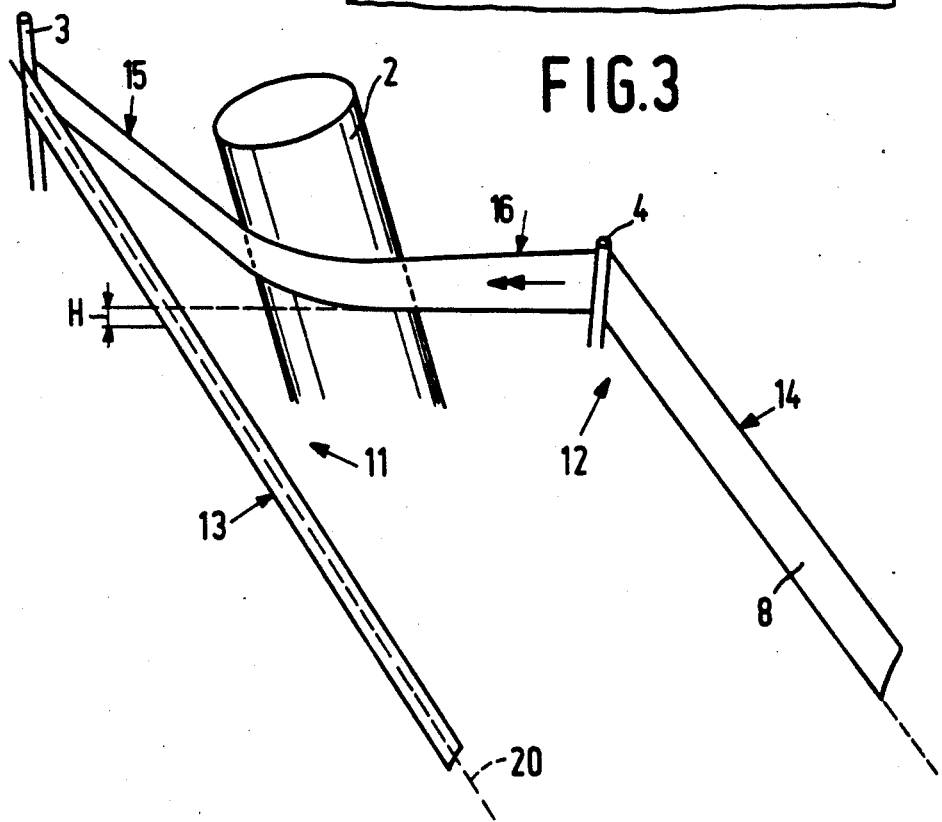
FIG. 4 illustrates the effect of the tape being twisted in a fourth path section.
Figure 5:
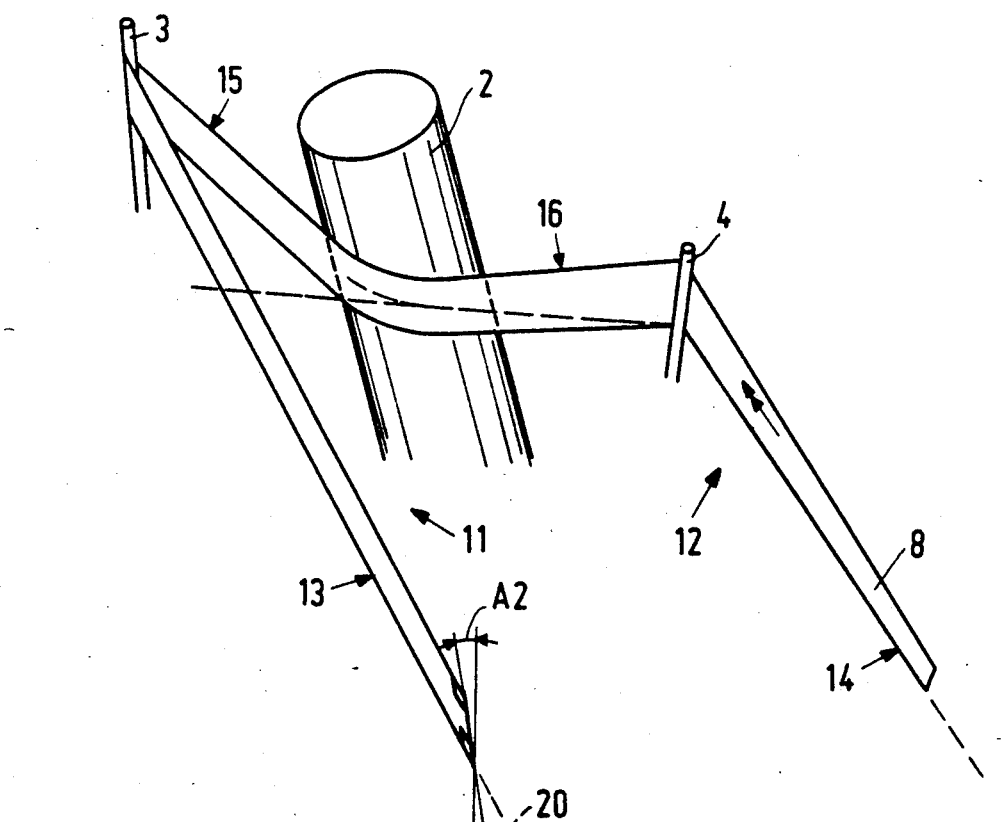
FIG. 5 illustrates the effect of the tape being twisted in the second path section.
Figure 6:
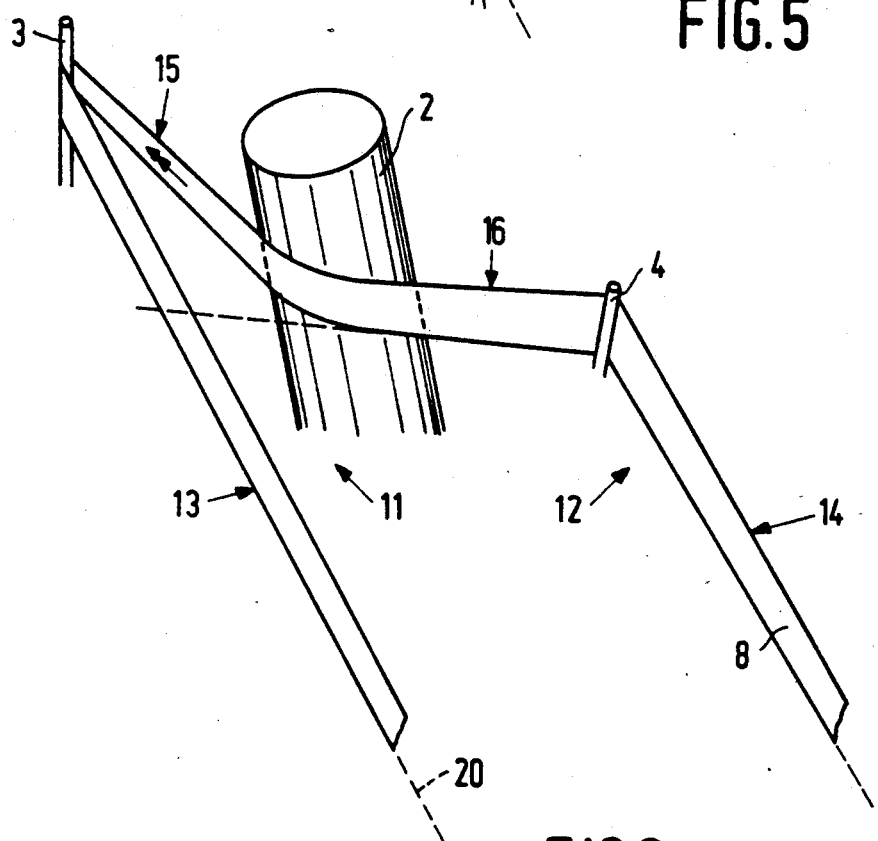
FIG. 6 illustrates the effect of the tape being twisted in a third path section.

If the first, the second and the third path section 13, 14, 15 extend parallel to each other and the fourth path section 16 is perpendicular thereto, as is shown in FIG. 3, the twist in the fourth path section 16, as a result of which the tape 8 is twisted about its central axis parallel to the longitudinal direction of the tape, will result in a change in inclination A1 of the first path section 13 relative to the reel surface 20 (FIG. 4). The twist in the second path section 14 will result in a height variation H of the first section 13 relative to the reel surface 20 (FIG. 5). However, owing to the twist in the second section 14 the transverse direction of the tape 8 in the first section 13 will be inclined at an angle A2 relative to a plane perpendicular to the reel surface 20, which is undesirable in view of a correct take-up of the tape 8 on the first reel 9. In order to achieve that the lateral direction of the tape again extends perpendicularly to the reel surface 20 the tape 8 is twisted through an angle A2 in the third section 15 (FIG. 6). Instead of twisting in the third section it is also possible to twist the tape in the first section because in the present case these two sections extend parallel to one another.

In the above manner it is possible to return the first section 13 to the plane of the reel surface 20, thus enabling the tape 8 to be wound correctly onto the first reel 9. The principle of correcting the first section 13 by means of twisting in the second, the third and the fourth sections 14, 15, 16 can also be applied if the path sections extend at arbitrary angles relative to one another. Twisting the tape in one of the sections then does not result in a specific angular or height variation of the first section 13 but leads to a combined height and angular variation in the first section 13. However, the second and the fourth section 14, 16 should not extend parallel to each other, because in that case they will both give rise to a similar change in the first section.

Figure 7:
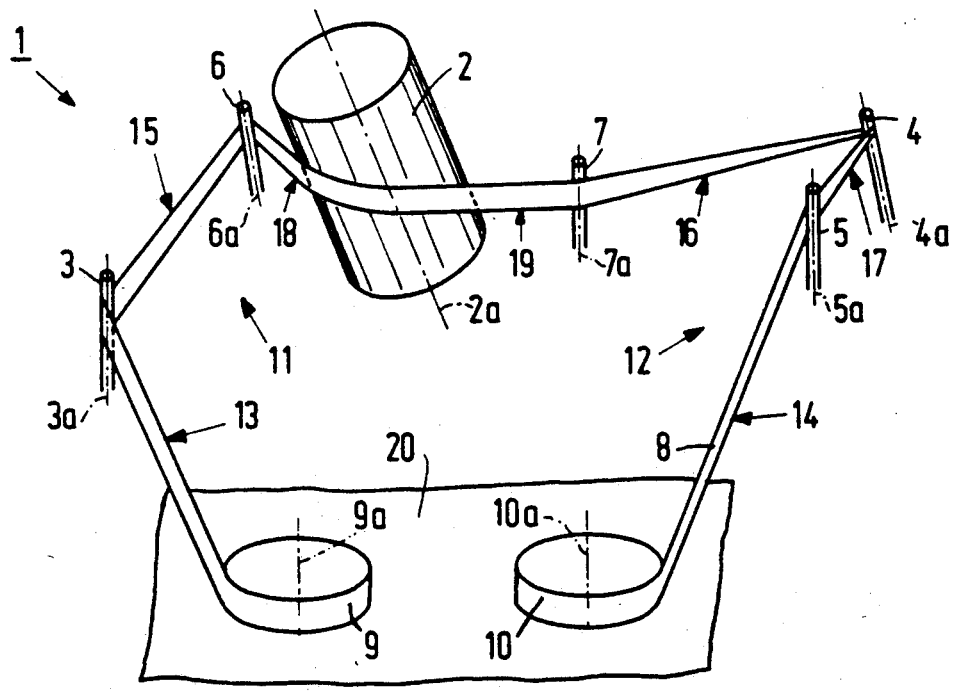
FIG. 7 shows the tape-transport path in the apparatus in an operation position and with six tape guides.

In the embodiment shown in FIG. 7 a third tape guide 5 is arranged between the second reel 10 and the second tape guide 4, a fourth tape guide 6 is arranged between the first tape guide 3 and the magnetic-head unit 2, and a fifth tape guide 7 is arranged between the magnetic-head unit 2 and the second tape guide 4. As a result of this, the second section 14 will be situated between the second reel and the third tape guide 5, the third section 15 will be situated between the first tape guide 3 and the fourth tape guide 6, and the fourth section 16 will be situated between the fifth tape guide 7 and the second tape guide 4. Twisting is now effected in the third, the fourth and the fifth sections 15, 16, 17. This has the advantage that these sections 15, 16, 17 in which twisting is effected can now provide a better guidance and that the lace-up from and towards the magnetic-head unit 2 and to the second reel 10 proceeds more smoothly because the tape 8 is guided in the appropriate manner from and towards the magnetic-head unit 2 and towards the second reel 10 by means of the third, the fourth and the fifth tape guide 5, 6, 7. A sixth section 18 is situated between the magnetic-head unit 2 and the fourth tape guide 6 and a seventh section 19 is situated between said unit 2 and the fifth tape guide 7. By also twisting the magnetic tape 8 in these sections 18, 19 and, if required, also in the first and the second section 13, 14 the amount of twisting in the other three twisting sections 15, 16, 17 can be reduced, which has a favourable effect on the stress in the tape 8.

Figure 8:
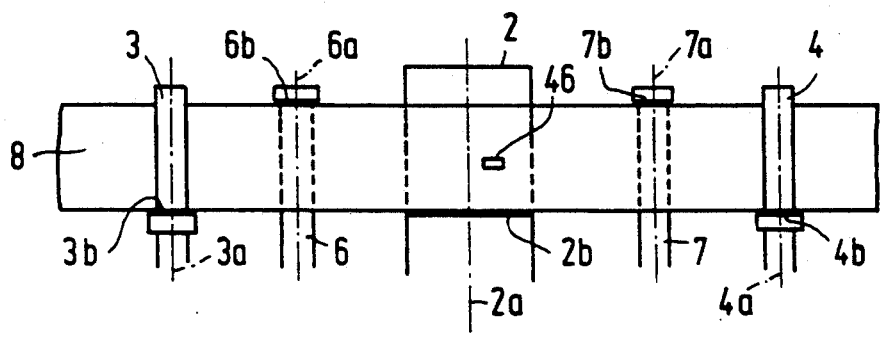
FIG. 8 illustrates the tape-transport path at the location of the magnetic-head unit and the adjacent tape guides.

Another important advantage of the two additional tape guides 6, 7 resides in the fact that the first, the fourth, the fifth and the second tape guide 3, 6, 7, 4 and the magnetic-head unit 2 constitute a "sandwich" construction, so that the magnetic tape 8 is pressed onto a tape-guide edge 2b of the magnetic-head unit 2 (FIG. 8). The lateral guide elements 3b, 4b, 6b, 7b on the tape guides 3, 4, 6, 7, which press against the tape edges result in the magnetic tape 2 being subjected to an upwardly directed force at the location of the first and the second lateral guide portions 3b, 4b and a downwardly directed force at the location of the fourth and the fifth lateral guide portions 6b, 7b. As a result of this, the tape 8 is pressed onto the tape-guide edge 2b of the magnetic-head unit 2, thus ensuring that the tape 8 is positioned accurately relative to the magnetic heads 4b in the magnetic-head unit 2.

Figure 9:
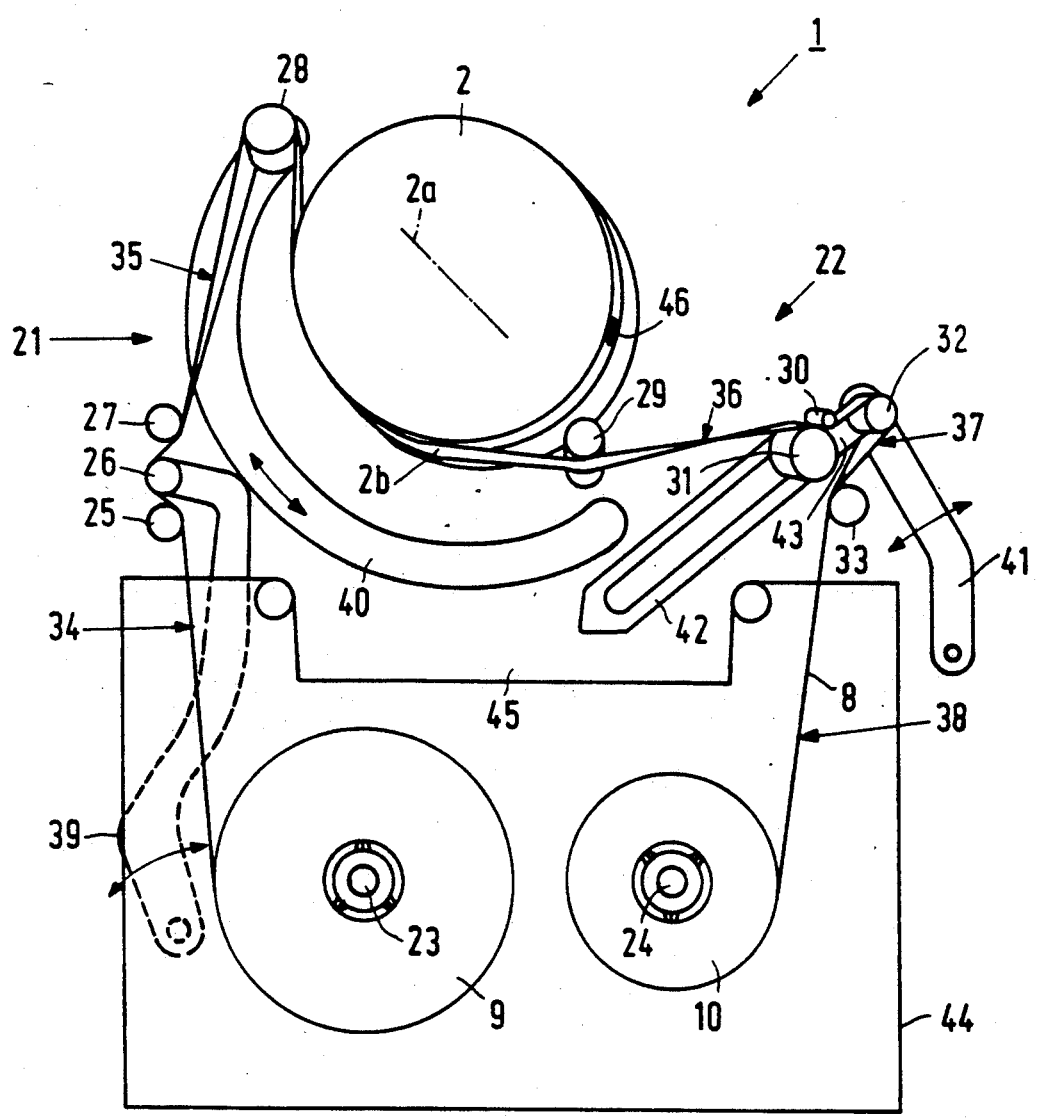
FIG. 9 shows an apparatus comprising a tape-transport path with three twisting path sections, each situated between two tape guides.

FIG. 9 shows a tape transport in accordance with the invention used in a helical-scan magnetic tape apparatus 1. The apparatus 1 is constructed to co-operate with a magnetic tape 8 wound on reels 9, 10 in a cassette 44. The reels 9, 10 can be driven by means of spindles 23, 24. The tape 8 extends from the first reel 9 to a magnetic-head unit 2 along a first branch 21, which unit also functions as a tape guide and carries magnetic heads 46. From the magnetic-head unit 2 the tape 8 extends to the second reel 10 along a second branch 22. In the first branch 21 the tape 8 extends to the magnetic-head unit 2 from the first reel 9 via two tape guides 25, 27, between which a tape-tension sensor 26 is arranged, and via a further tape guide 28, which also functions as a tape threading element.

The tape takes a helical path around the magnetic-head unit 2 over an edge 2b. Subsequently, in the second branch 22 the tape 8 runs to a combination of a capstan 30 and a pressure roller 31 via a further tape guide 29, which combination also functions as a tape guide, after which the tape runs to the second reel 10 via two further tape guides 32, 33, of which the tape guide 32 also functions as a tape-threading element. The two branches 21, 22 comprise a first and a second path section 34, 38 disposed in the same plane as the reels 9, 10, and a third, a fourth and a fifth path section 35, 36, 37 in which the tape 8 is twisted. The tape-threading elements 28 and 32, the pressure roller 31, and the tape-tension sensor 26 are movable between an operational position, as shown in FIG. 9, and a non-operational position, not shown in the Figures.

For this purpose the first tape-threading element 28 is arranged on an annular element 40, i.e. the second tape-threading element 32 and, the tape-tension sensor 26 are arranged on arms 41 and 39 respectively, and the pressure roller 31 is connected to the tape-threading element 32 via a connecting element 43 which is guided by a guide plate 42 in the apparatus. The elements 40 and the arms 39, 41 are movable by drive means, not shown, in directions indicated by the arrows in FIG. 9. In the non-operational position the tape-threading elements 28, and 32, the pressure roller 31, and the tape-tension sensor 26 are disposed in a recess 45 formed in the cassette 44 and the cassette 44 can be removed from the apparatus 1.

In another embodiment the tape is also twisted in the sections between the magnetic-head unit 2 and the first tape-threading element 28, between the magnetic-head unit 2 and the tape guide 29, and between the capstan 30 and the second tape-threading element 32 by arranging the relevant elements at specific angles relative to one another. As a result of this, the three angles through which the tape is to be twisted are divided amongst six path sections, which reduces the increase in stress in the tape as a result of twisting.

It is to be noted that said tape transport can be employed in any magnetic-tape apparatus in which a tape is guided around a magnetic head along a helical path so that a difference in level and inclination relative to the desired tape path arises, providing that this apparatus comprises at least three tape guides. Suitably, this tape transport is used in a digital audio recorder referred to as a DAT recorder, because owing to the small width of the magnetic tape used in conjunction with such a recorder the increase in stress in the tape as a result of twisting of the tape is minimal. It is also possible to use another tape transport with a different wrapping angle around the magnetic-head unit. Moreover, the tape-transport path may comprise another number of twisting path-sections than mentioned above, but this number should be at least three.

We claim:

1. A helical-scan magnetic-tape apparatus (1) comprising at least three tape guides (2, 3, 4) having axes (2a, 3a, 4a), and including a magnetic-head unit (2), which also serves as one of said tape guides, at least two of said guides also acting as tape-threading elements (3, 4) which are movable between a first position, corresponding to a non-operational situation in which the magnetic tape (8) is not in contact with the tape guides (2, 3, 4), and a second position, corresponding to an operational situation in which the magnetic tape (8) is in contact with the tape guides (2, 3, 4), which apparatus (1) is constructed to cooperate with a magnetic tape (8) which is is wound on first and second co-planar reels (9, 10), which each have an axis (92, 102) and extends between said first reel (9) and said second reel (10) in the operational situation, a first branch (11) being provided between the first reel (9) and the magnetic-head unit (2) and a second branch (12) being provided between the second reel (10) and the magnetic-head unit (2), each branch (11, 12) including at least one tape guide (3, 4), a first path section (13) being provided between said first reel (9) and the tape guide (3) nearest said first reel, viewed in the direction of tape transport, a second path section (14) being provided between said second reel (10) and the nearest tape guide (4), viewed in the direction of tape transport, and further path sections (15, 16) being provided between two tape guides situated one after the other viewed in the direction of tape transport, both the first and second path section (13, 14) being disposed in the same plane (20) as the reels (9, 10), wherein:

- at least three path sections (14, 15, 16) of the tape (8) are twisted by one of:
- the axes of two adjacent tape guides, and the axes of a reel and an adjacent tape guide, between which a twisting tape path sections extends,
- the first branch (11) includes at least one of said path sections; (15) and
- the second branch (12) includes at least two of said path sections (14, 16) in which the tape path (8) is twisted, at least two twisted path sections within a given branch being nonparallel.

2. A helical-scan magnetic-tape apparatus (1) as claimed in claim 1, characterized in that the apparatus comprises at least six tape guides (2, 3, 4, 5, 6, 7), of which at least two tape guides (3, 6) are arranged in the first branch (11) and at least three tape guides (4, 5, 7) are arranged in the second branch (12).

3. A helical-scan magnetic-tape apparatus (1) as claimed in claim 2, characterized in that more than three twisting path sections are provided, at least one twisting path section being provided in each branch (11, 12).

4. A helical-scan magnetic-tape apparatus (1) as claimed in claim 3, characterized in that at least one of the tape guides is a roller.

5. A helical-scan magnetic-tape apparatus as claimed in claim 1, characterized in that more than three twisting path sections are provided, at least one twisting path section being provided in each branch.

6. A helical-scan magnetic-tape apparatus as claimed in claim 5, characterized in that at least one of the tape guides is a roller.

7. A helical-scan magnetic-tape apparatus as claimed in claim 2, characterized in that at least one of the tape guides is a roller.

8. A helical-scan magnetic-tape apparatus as claimed in claim 1, characterized in that at least one of the tape guides is a roller.

* * * * *